United States Patent
Schulz

(10) Patent No.: US 10,239,422 B2
(45) Date of Patent: Mar. 26, 2019

(54) CONNECTING ELEMENT

(71) Applicant: Adient Luxembourg Holding S.à.r.l., Luxembourg (LU)

(72) Inventor: Hans-Rudi Schulz, Radevormwald (DE)

(73) Assignee: Adient Luxembourg Holding S.à.r.l., Luxembourg (LU)

( * ) Notice: Subject to any disclaimer, the term of this patent is extended or adjusted under 35 U.S.C. 154(b) by 0 days.

(21) Appl. No.: 15/526,823

(22) PCT Filed: Oct. 12, 2015

(86) PCT No.: PCT/EP2015/073514
§ 371 (c)(1),
(2) Date: May 15, 2017

(87) PCT Pub. No.: WO2016/074871
PCT Pub. Date: May 19, 2016

(65) Prior Publication Data
US 2017/0327008 A1    Nov. 16, 2017

(30) Foreign Application Priority Data

Jan. 30, 2015 (DE) .......................... 10 2015 201 649

(51) Int. Cl.
*B60N 2/10* (2006.01)
*B60N 2/16* (2006.01)
*B60N 2/427* (2006.01)

(52) U.S. Cl.
CPC .............. *B60N 2/10* (2013.01); *B60N 2/165* (2013.01); *B60N 2/1615* (2013.01); *B60N 2/42709* (2013.01)

(58) Field of Classification Search
CPC ............. B60N 2/10; B60N 2/16; B60N 2/165
See application file for complete search history.

(56) References Cited

U.S. PATENT DOCUMENTS

| | | | | |
|---|---|---|---|---|
| 6,220,669 B1 * | 4/2001 | Frohnhaus | ........... | B60N 2/1615 297/440.14 |
| 7,517,020 B2 * | 4/2009 | Yokota | ................. | B60N 2/1615 248/421 |

(Continued)

FOREIGN PATENT DOCUMENTS

| | | |
|---|---|---|
| DE | 100 11 147 A1 | 10/2001 |
| DE | 10 2004 033 605 B4 | 12/2006 |

(Continued)

*Primary Examiner* — Philip F Gabler
(74) *Attorney, Agent, or Firm* — McGlew and Tuttle, P.C.

(57) ABSTRACT

A connecting element (3) for adjusting the height of a vehicle seat (1) includes an angular element (3.1) with a first leg (3.1.1) having a seat part side receiving opening (3.1.5) and an opposite rail side end receiving opening (3.1.4), and a second leg (3.1.2) angled relative to the first leg (3.1.1) and a tooth element (3.2). The seat part receiving opening (3.1.5) is situated in a connection area of the first leg (3.1.1) and of the second leg (3.1.2). The tooth element (3.2) has a first section (3.2.1) configured as a circular arc with toothing (V2) that is connected at an end side to the second leg (3.1.2) and a second section (3.2.2) that is angled from the first section (3.2.1) in the direction of the receiving opening (3.1.5) on the side of the seat part and is connected to the first leg (3.1.1) at the end side.

20 Claims, 6 Drawing Sheets

(56) References Cited

U.S. PATENT DOCUMENTS

| | | | | |
|---|---|---|---|---|
| 7,828,384 | B2* | 11/2010 | Shinozaki | B60N 2/1615 297/344.14 |
| 8,177,280 | B2* | 5/2012 | Yamada | B60N 2/161 296/65.05 |
| 8,616,636 | B2* | 12/2013 | Arata | B60N 2/165 297/216.1 |
| 8,616,645 | B2* | 12/2013 | Ito | B60N 2/1615 297/344.15 |
| 8,800,947 | B2* | 8/2014 | Suzuki | B60N 2/161 248/421 |
| 9,266,449 | B2* | 2/2016 | Behrens | B60N 2/1615 |
| 2013/0200677 | A1* | 8/2013 | Hoshi | B60N 2/1615 297/344.15 |
| 2014/0183918 | A1* | 7/2014 | Kaku | B60N 2/002 297/344.15 |
| 2014/0339874 | A1* | 11/2014 | Behrens | B60N 2/1615 297/344.15 |
| 2017/0327008 | A1* | 11/2017 | Schulz | B60N 2/165 |

FOREIGN PATENT DOCUMENTS

| | | |
|---|---|---|
| DE | 10 2008 004998 A1 | 12/2008 |
| DE | 10 2011 122275 A1 | 6/2013 |
| DE | 10 2012 107 141 A1 | 6/2013 |
| EP | 0 806 319 B1 | 9/1998 |
| EP | 2 062 772 A1 | 5/2009 |
| JP | 2011 173497 A | 9/2011 |
| JP | 2013 193496 A | 9/2013 |

\* cited by examiner

CONNECTING ELEMENT

CROSS REFERENCE TO RELATED APPLICATIONS

This application is a United States National Phase Application of International Application PCT/EP2015/073514, filed Oct. 12, 2015, and claims the benefit of priority under 35 U.S.C. § 119 of German Applications 10 2014 223 209.0, filed Nov. 13, 2014, and 10 2015 201 649.8 filed Jan. 30, 2015, the entire contents of which are incorporated herein by reference.

FIELD OF THE INVENTION

The invention relates to a connecting element for adjusting the height of a vehicle seat and a vehicle seat.

BACKGROUND OF THE INVENTION

Generic connecting elements for adjusting the height of a vehicle seat are arranged, or are to be arranged, between a seat part of a vehicle seat and a guide rail of this vehicle seat.

Height-adjustable vehicle seats are known from the prior art. For example, a height adjustment device for a vehicle seat is disclosed in EP 0 806 319 B1, wherein said height adjustment device comprises a toothed sector of a circle which is connected to a pivotable arm and which is in engagement with a pinion which is rotatably mounted on a carrier.

Moreover, a safety device of a seat for a vehicle with a height adjustment device is disclosed in DE 10 2012 107 141 A1 and a motor vehicle seat with an articulated backrest and a means for blocking the backrest in the event of a front impact is disclosed in DE 10 2004 033 605 B4.

SUMMARY OF THE INVENTION

It is an object of the present invention to provide a connecting element which is improved relative to the prior art for the height adjustment of a vehicle seat and a vehicle seat which is improved relative to the prior art.

A connecting element for adjusting the height of a vehicle seat comprises an angular element which comprises at least one first leg with a receiving opening on the seat part side arranged at the end, and a receiving opening on the rail side arranged at the opposite end, and which comprises a second leg which is angled relative to the first leg, wherein the receiving opening on the seat part side is located in a connection area of the first leg and of the second leg. The connecting element also comprises a toothed element.

According to the invention, it is provided that the toothed element comprises two sections which are angled relative to one another, wherein a first section is substantially configured as a circular arc comprising a toothing and is connected at the end side to the second leg and wherein a second section is angled from the first section in the direction of the receiving opening on the seat part side and is connected at the end side to the first leg.

The connecting element which is configured in such a manner permits, compared to the prior art, a more efficient absorption of energy which, for example in the event of a collision, for example a front collision, acts on the vehicle seat and thus on the connecting element. This is possible, in particular, as the toothed element has two sections, wherein the second section is arranged on the first leg and is angled from the first section in the direction of the receiving opening on the seat part side. The toothed element in this case is positioned relative to the angular element such that the receiving opening on the seat part side forms a center of a circle of the first section. Thus the first leg has an available length which is as long as possible for absorbing energy, whereby the risk and/or the extent of a deformation of the connecting element, in particular in the direction of the vehicle transverse axis, and thus the risk that the toothing is moved out of engagement with a corresponding pinion for adjusting a pivot angle of the connecting element, is effectively reduced compared to the prior art. Thus the stability of a connection between a seat part of a vehicle seat and a guide rail is improved in the event of a collision.

A fastening point of the second section to the first leg is arranged between the receiving opening on the seat part side and the receiving opening on the rail side, such that a spacing of the fastening point relative to the receiving opening on the seat part side is smaller than that relative to the receiving opening on the rail side. Thus, a deformation zone for absorbing energy is significantly increased relative to the prior art. The deformation zone in this case extends from an end of the first leg comprising the receiving opening on the rail side, which is configured as a free end, and the fastening point of the second section to the first leg.

According to a preferred variant, the toothed element is connected by a force-fit connection to the angular element, so that the connecting element is configured in two parts. The force-fit connection permits a fixed connection of the toothed element to the angular element so that when collision energy is introduced a deformation of the first leg of the angular element is possible and the collision energy is not transmitted to the toothed element in a manner which is virtually without friction. For example, a riveted connection or screw connection may be provided as the force-fit connection.

Moreover, the angular element is substantially configured so as to form a first plane, wherein the toothed element is configured so as to form a second plane parallel thereto, so that in each case one end of the toothed element at least partially overlaps in contact with the first leg and/or the second leg. The overlapping is in this case located at the fastening point of the second section with the first leg and a fastening point of the first section with the second leg. As the toothed element is arranged parallel to the angular element, the connecting element is mechanically stabilized.

According to a further preferred variant, the angular element comprises a third leg which is fastened to the second leg and comprises a further toothing, wherein the third leg is arranged so as to bear against the first section such that the toothings extend with their contours flush against one another. The third leg in this case supports the toothing of the toothed element so that a mechanically stable and reliable height adjustment of a vehicle seat may be ensured.

Particularly preferably, the third leg comprises a free end which is spaced apart from the first leg. The third leg is thus not fixedly connected to the first leg, whereby the connecting element has a certain resilience, in particular in the direction of the vehicle transverse axis and thus perpendicular to the first and second planes. Thus, the deformation zone of the first leg, which is increased relative to the prior art, is maintained.

A vehicle seat according to the invention is also provided, said vehicle seat comprising a seat part, at least one guide rail and at least one connecting element according to the invention, wherein the at least one connecting element connects the seat part to the guide rail, and wherein by means of the connecting element a vertical position of the seat part relative to the guide rail is able to be altered.

The vehicle seat is improved relative to the prior art since by means of the connecting element, which permits optimal energy absorption in the event of a collision, said vehicle seat provides increased safety for the vehicle occupants.

According to a preferred variant, the receiving opening on the seat part side, which is located in the connection area of the first and the second legs, forms with the seat part a first rotary joint, wherein the receiving opening on the rail side of the first leg forms with the guide rail a second rotary joint. The seat part is thus individually adjustable in terms of the height and tilt thereof relative to the guide rail.

According to a further preferred variant, a pinion is arranged on the seat part, said pinion engaging in the toothing of the connecting element. In this case, for adjusting the height of the vehicle seat, a pivot angle of the connecting element is able to be altered by means of the pinion.

Exemplary embodiments of the invention are described in more detail with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
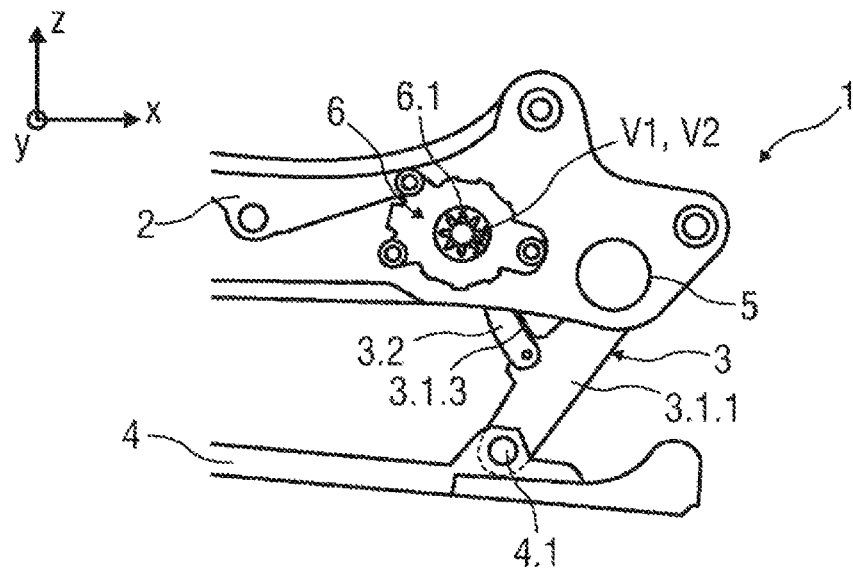
FIG. 1 is a schematic view of a detail of a vehicle seat in a side view, with a connecting element for adjusting the height of the vehicle seat according to the prior art.

Referring to the drawings, parts which correspond to one another are provided in all of the figures with the same reference numerals.

For improved clarity, a coordinate system with a longitudinal axis x, a transverse axis y and a vertical axis z is shown in FIGS. 1, 2, 4, 5 and 9 to 12.

Figure 2:
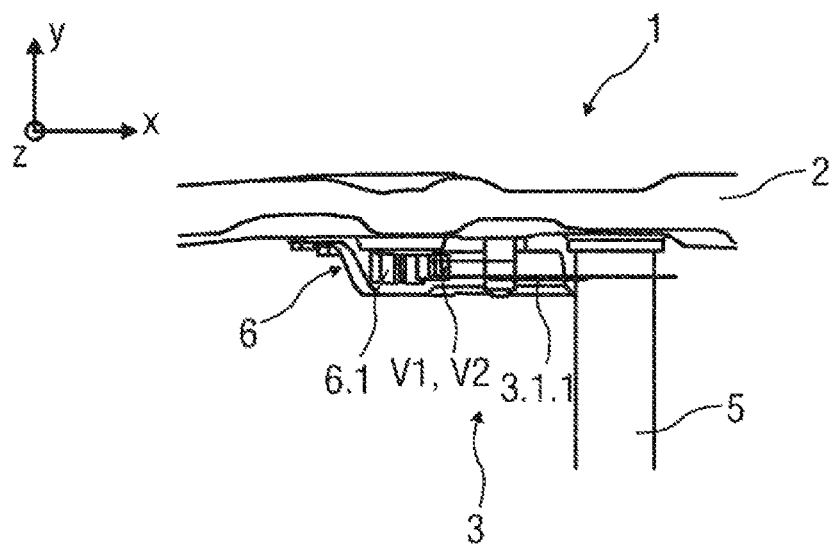
FIG. 2 is a schematic view of the detail of the vehicle seat according to FIG. 1 in a view from below.

FIGS. 1 and 2 show in each case a detail of a vehicle seat 1 according to the prior art in a schematic view, wherein FIG. 1 shows the vehicle seat 1 in a side view and FIG. 2 shows the vehicle seat in a view from below.

The vehicle seat 1 is provided for arranging in a front region of a vehicle, not shown, wherein with reference to the coordinate system shown the longitudinal axis x is a vehicle longitudinal axis parallel to a direction of travel, the transverse axis y is a vehicle transverse axis or a vehicle width and the vertical axis z is a vehicle vertical axis or a vehicle height.

The vehicle seat 1 comprises a seat part 2, a connecting element 3 and a guide rail 4, wherein the seat part 2 is connected to the guide rail 4 by means of the connecting element 3, further details being provided below. The vehicle seat 1 may also comprise a backrest part, not shown, which is pivotably arranged relative to the seat part 2, and at least one further connecting element 3. In this case, the connecting element 3, shown here, represents in particular a rear connecting element 3 relative to the longitudinal axis x.

The seat part 2 shown forms a seat surface for a vehicle occupant, not shown, and is able to be adapted to the vehicle occupant in its position, in particular in its vertical position, relative to the guide rail 4 by means of the connecting element 3. In the exemplary embodiment shown, the seat part 2 may also constitute a seat part frame.

Figure 3:
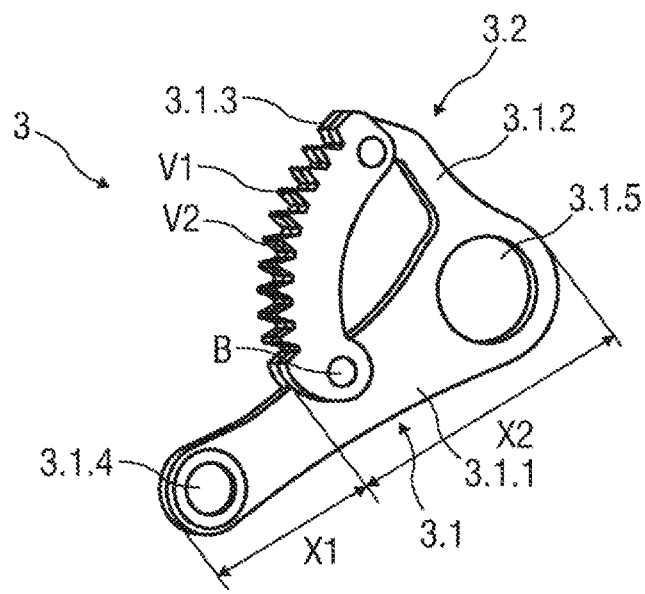
FIG. 3 is a schematic view of the connecting element according to the prior art in a perspective view.

The connecting element 3 is shown and described in more detail in a perspective view in FIG. 3. In this case, a coordinate system is not shown since the connecting element 3 is able to be altered in its position relative to the vehicle.

The connecting element 3 comprises an angular element 3.1 and a toothed element 3.2. The angular element 3.1 in this case is substantially configured so as to form a first plane and the toothed element 3.2 is configured so as to form a plane parallel thereto. The angular element 3.1 and the toothed element 3.2 are described in more detail hereinafter.

The angular element 3.1 has three legs 3.1.1 to 3.1.3, wherein a first leg 3.1.1 is configured as a connecting web and has two receiving openings 3.1.4, 3.1.5, the connecting element 3 being connected thereby to the seat part 2 and the guide rail 4.

In this case a receiving opening 3.1.4 on the rail side is arranged at a free end of the first leg 3.1.1 and serves for receiving a coupling element 4.1, for example a connecting pin, of the guide rail 4, as is shown by way of example in FIG. 1. The coupling element 4.1 in this case is arranged in the first receiving opening 3.1.4 such that the connecting element 3 is rotatable about a pivot point formed by the receiving opening 3.1.4 on the rail side.

In one exemplary embodiment, not shown, instead of the receiving opening 3.1.4 on the rail side, the first leg 3.1.1 has a connecting pin for the rotatable arrangement on the guide rail 4. Accordingly, in this case the guide rail 4 has a recess or opening receiving the connecting pin.

A receiving opening 3.1.5 on the seat part side is arranged at an opposing end of the first leg 3.1.1 on the front face and serves for receiving a shaft 5 which forms a rotational axis in the direction of the transverse axis y. The shaft 5 in this case is configured as a rod, as FIG. 2 shows, which extends in the direction of the transverse axis y over a width of the vehicle seat 1 and in this case is arranged in a rear lower region of the seat part 2 relative to the longitudinal axis x and the vertical axis z. The receiving opening 3.1.5 on the seat part side thus forms with the shaft 5 a first rotary joint and the receiving opening 3.1.4 on the rail side forms with the coupling element 4.1 a second rotary joint.

The first leg 3.1.1 is connected to a second leg 3.1.2, which is angled relative to the first leg 3.1.1, wherein the receiving opening 3.1.5 on the seat part side is arranged in the connection area of the first leg 3.1.1 and of the second leg 3.1.2.

The second leg 3.1.2 is connected at an end remote from the first leg 3.1.1 to a third leg 3.1.3 which is angled from the second leg 3.1.2 in the direction of the first leg 3.1.1. In this case, the third leg 3.1.3 is connected by one end on the front face to the second leg 3.1.2 and by an opposing end on the front face to the first leg 3.1.1.

The third leg 3.1.3 is substantially formed as a circular arc and has a toothing V1 which is operatively mechanically connected to an adjusting unit 6, shown in FIGS. 1 and 2, for adjusting the height of the seat part 2. In this case, a pivot angle of the connecting element 3, in particular, is able to be altered relative to the guide rail 4 by the adjusting unit 6, wherein the adjusting unit 6 is actuatable manually or by motor, for example by means of an actuating lever or electric motor, not shown.

The adjusting unit 6 comprises a pinion 6.1 which performs a rotational movement when the adjusting unit 6 is actuated. Since the teeth of the pinion 6.1 engage in the toothing V1, the rotational movement of the pinion 6.1 is transmitted to the connecting element 3, which is accordingly pivoted for adjusting the height of the seat part 2.

The toothing V1 is mechanically stabilized by means of the toothed element 3.2 which also has a toothing V2, which is arranged on a circular arc in the same manner as the third leg 3.1.3.

The toothed element 3.2 in this case is fastened with one end to the second leg 3.1.2 and with an opposing end to the first leg 3.1.1, in particular by a force-fit connection, and is arranged so as to bear against the third leg 3.1.3 such that the toothings V1, V2 extend with their contours flush against one another.

A center of the circle of the circular arc-shaped toothed element 3.2 and of the third leg 3.1.3 is formed by the receiving opening 3.1.5 on the seat part side.

The pinion 6.1 thus engages both in the toothing V2 of the toothed element 3.2 and in the toothing V1 of the angular element 3.1 in the manner described above.

Moreover, a first region X1 and a second region X2 are defined by a fastening point B of the toothed element 3.2 on the first leg 3.1.1.

The first region X1, also called the bending region, the bending length or deformation zone, absorbs energy by means of a deformation in the event of a collision. By means of the third leg 3.1.3 and the toothed element 3.2, the second region X2 is more rigid than the first region X1 and thus is able to absorb less energy by deformation. When introducing higher levels of collision energy, in this case the connecting element 3 in the second region X2 is deformable such that the toothings V1, V2 are brought out of engagement with the pinion 6.1 as FIGS. 4 and 5 show by way of example.

Figure 4:
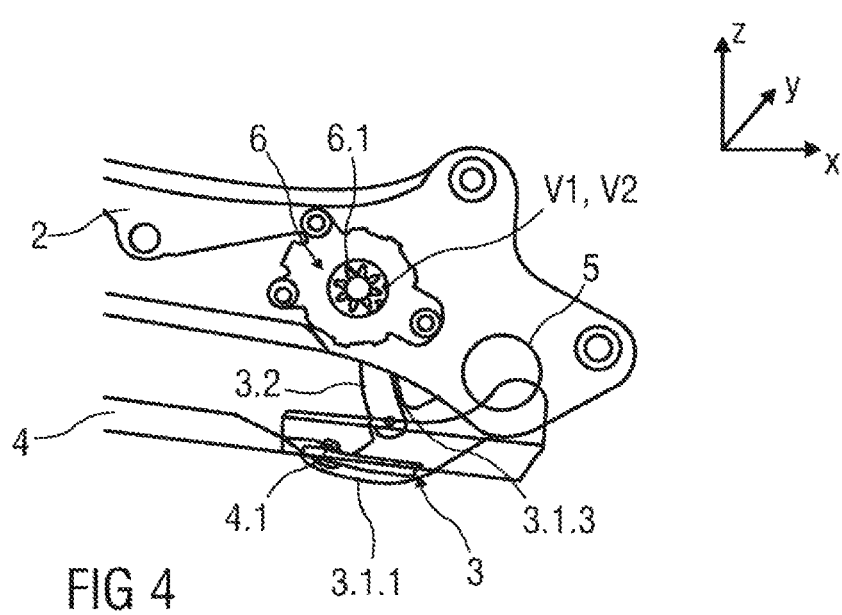
FIG. 4 is a schematic view of the detail of the vehicle seat according to FIG. 1, schematically in a side view after the effect of collision energy.
Figure 5:
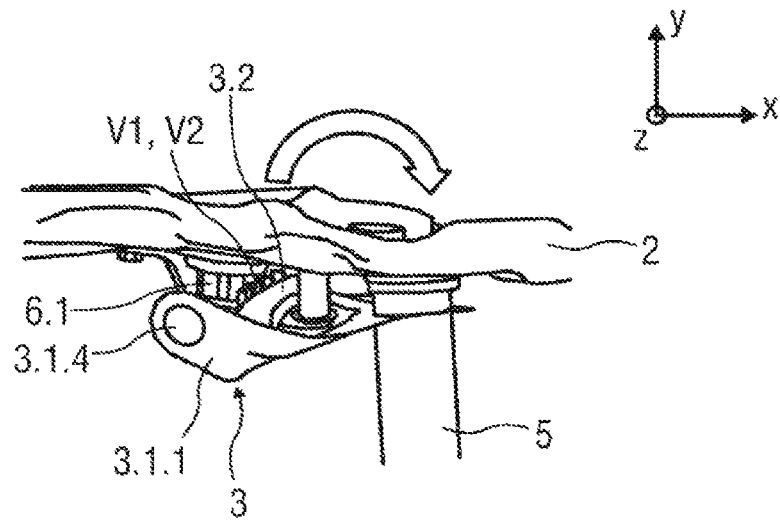
FIG. 5 is a schematic view of the detail of the vehicle seat according to FIG. 4 in a view from below.

FIGS. 4 and 5 show the detail of the vehicle seat 1 according to the prior art after the effect of an external force, for example a collision with a deformed connecting element 3 and a deformed guide rail 4.

Due to the acting forces the first leg 3.1.1 in the first region X1 is deformed, in particular bent, in the direction of the transverse axis y, such that the toothings V1, V2 of the connecting element 3 and the teeth of the pinion 6.1 are displaced relative to one another and thus are brought out of engagement with one another. An adjustment of the height of the vehicle seat 1 in this case is no longer possible. It is possible, as a result, that the connection of the seat part 2 to the guide rail 4 is no longer adequately ensured.

For a more efficient absorption of energy in the event of a collision, wherein the toothings V1, V2 of the connecting element 3 and the teeth of the pinion 6.1 are as far as possible still in engagement with one another, the invention proposes a connecting element 3 which is described in the following FIGS. 6 to 12.

Figure 6:
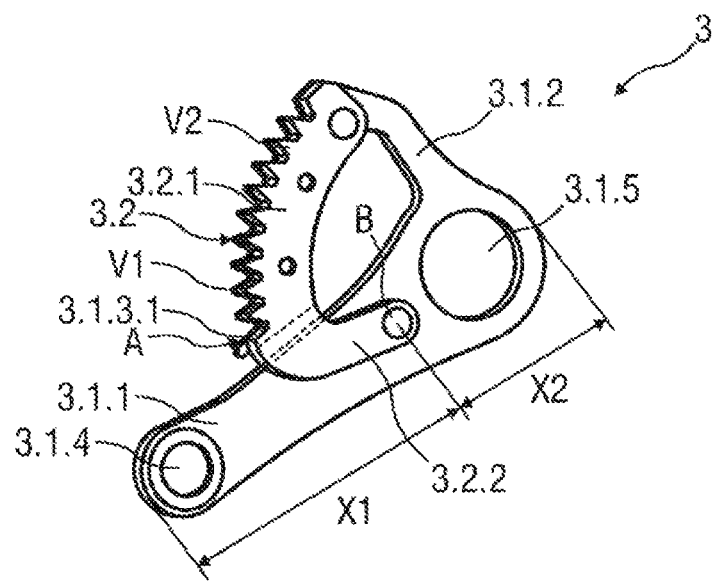
FIG. 6 is a schematic view of a connecting element in a perspective front view according to an exemplary embodiment according to the invention.
Figure 7:
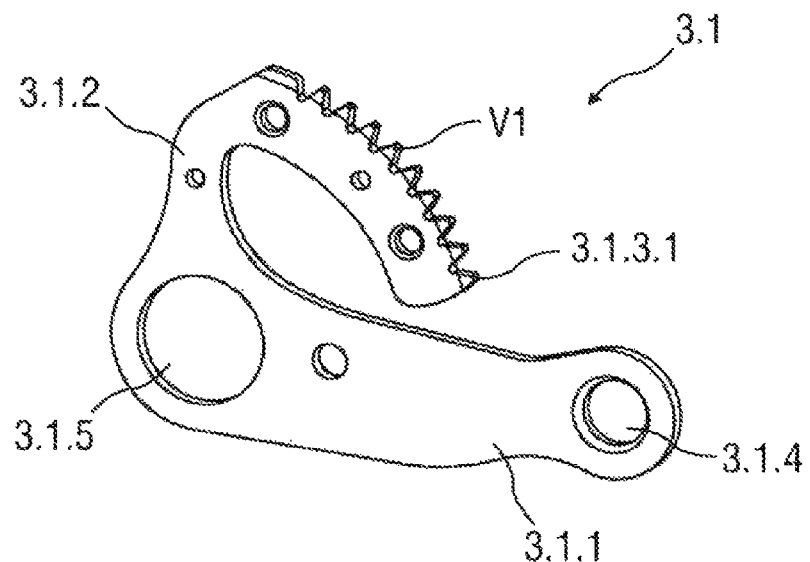
FIG. 7 is a schematic view of a part of the connecting element according to FIG. 6 in a perspective rear view.
Figure 8:
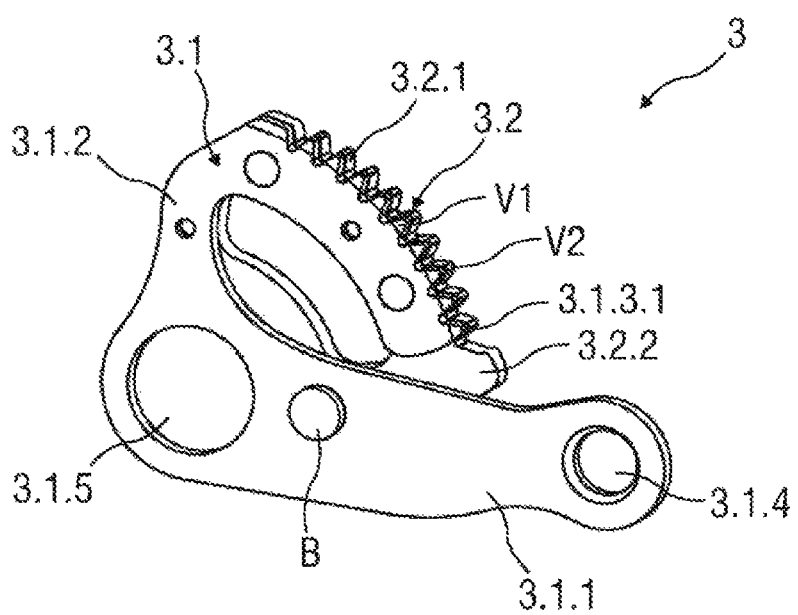
FIG. 8 is a schematic view of the entire connecting element according to FIG. 6 in a perspective rear view.
Figure 9:
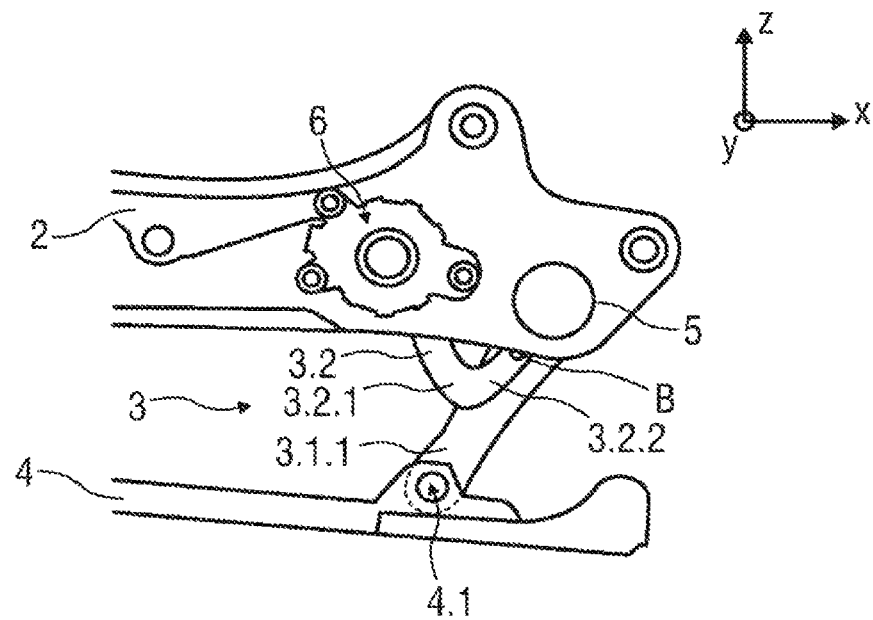
FIG. 9 is a schematic view of a detail of a vehicle seat in a side view with a connecting element for adjusting the height of the vehicle seat according to an exemplary embodiment according to the invention.
Figure 10:
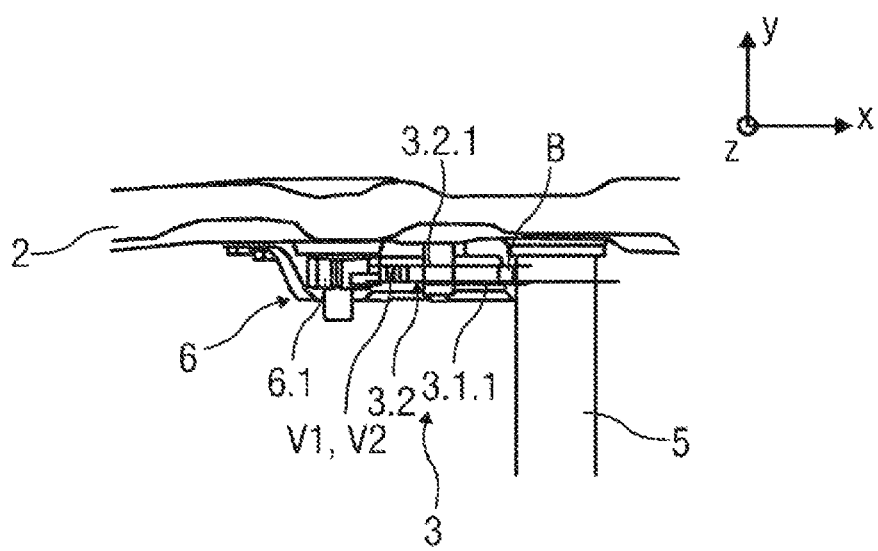
FIG. 10 is a schematic view of the detail of the vehicle seat according to FIG. 9 in a view from below.

To this end, FIG. 6 shows an exemplary embodiment according to the invention of a connecting element 3 for adjusting the height of the vehicle seat 1 in a perspective front view. FIGS. 7 and 8 show in each case the connecting element 3 in a perspective rear view, wherein in FIG. 7 only a part of the connecting element 3 is shown. FIGS. 9 and 10 show in each case a detail of the vehicle seat 1 with such a connecting element 3. In this case FIG. 9 shows the detail in a side view and FIG. 10 in a view from below, wherein the guide rail 4 is not shown.

The connecting element 3, similar to the connecting element 3 described in the above FIGS. 1 to 5, has an angular element 3.1 and a toothed element 3.2. The arrangement shown in FIGS. 9 and 10 of the connecting element 3 according to the invention on the vehicle seat 1 is also configured in a manner similar to the arrangement shown in FIGS. 1 and 2, wherein the connecting element 3 is connected to the seat part 2 and the guide rail 4.

The angular element 3.1, shown here, differs in this case from the angular element 3.1 described above, in that the third leg 3.1.3 has a free end 3.1.3.1 and thus is spaced apart from the first leg 3.1.1, wherein this is illustrated by two dashed lines in the exemplary embodiment shown. An upper dashed line in the viewing direction, in this case shows the edge of the free end 3.1.3.1 of the third leg 3.1.3 and a lower dashed line in the viewing direction shows the edge of the first leg 3.1.1. The third leg 3.1.3 is thus only fastened to the second leg 3.1.2 and is not additionally fastened to the first leg 3.1.1.

In other words, relative to the known connecting element 3 according to the description of FIG. 3, the angular element 3.1 has a continuous slot in the third leg 3.1.3. As a result, when arranged on the vehicle seat 1, as shown by way of example in FIGS. 9 and 10, the connecting element 3 according to the invention has a specific mechanical flexibility in the direction of the transverse axis y. For clarification thereof, FIGS. 7 and 8 show the connecting element 3 in a rear view, wherein FIG. 7 shows only the angular element 3.1. The resulting advantage thereof relative to the prior art is described in the descriptions of FIGS. 11 and 12.

As FIG. 6 shows, the free end 3.1.3.1 of the third leg 3.1.3 in the exemplary embodiment shown also has a stop A for limiting a pivot angle of the connecting element 3, further details thereof not being provided here.

According to the exemplary embodiment according to the invention shown, the toothed element 3.2 is subdivided into two sections 3.2.1, 3.2.2.

A first section 3.2.1 is configured in a similar manner to the toothed element 3.2 described above, wherein this toothed element is configured to be circular arc-shaped and has the toothing V2.

The first section 3.2.1 is also connected by one end to the second leg 3.1.2, in particular by means of a force-fit connection, for example by a screw or rivet connection. The first section 3.2.1 is connected by an opposing end to a second section 3.2.2. The first section 3.2.1 and the second section 3.2.2 are configured integrally with one another according to the exemplary embodiment shown.

The second section 3.2.2 is angled from the first section 3.2.1 in the direction of the receiver opening 3.1.5 on the seat part side and with an end remote from the first section 3.2.1 is fastened to the first leg 3.1.1, in particular is fastened by a force-fit connection, for example by means of a rivet or screw connection.

The fastening point B of the toothed element 3.2 on the first leg 3.1.1 in this case is arranged closer to the receiving opening 3.1.5 on the seat part side than the receiving opening 3.1.4 on the rail side. In other words, the fastening point B is in this case arranged between the receiving opening 3.1.5 on the seat part side and the receiving opening 3.1.4 on the rail side, such that a spacing of the fastening point B to the receiving opening 3.1.5 on the seat part side is smaller than the receiving opening 3.1.4 on the rail side.

As a result, and since the third leg 3.1.3 is no longer connected to the first leg 3.1.1, the first region X1 is increased in its length relative to the prior art, so that for absorbing energy a larger deformation zone is available and a greater capacity for absorbing force in this region is possible for the connecting element 3.

Figure 11:
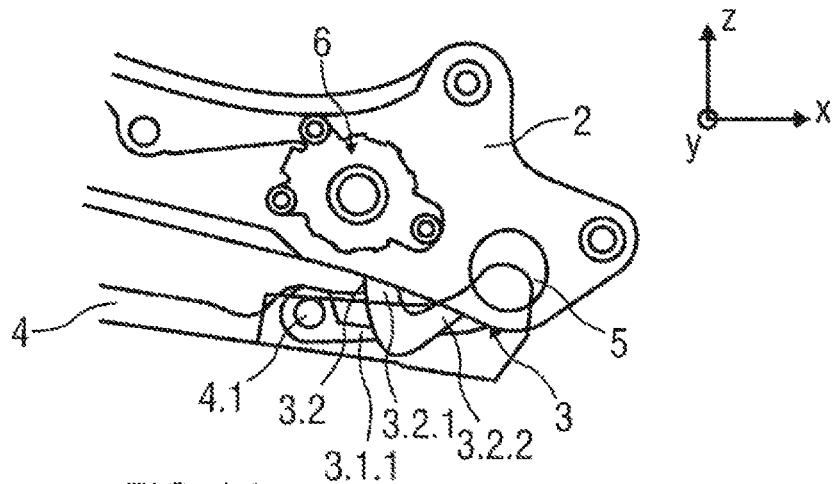
FIG. 11 is a schematic view of the detail of the vehicle seat according to FIG. 9 in a side view after the effect of collision energy.
Figure 12:
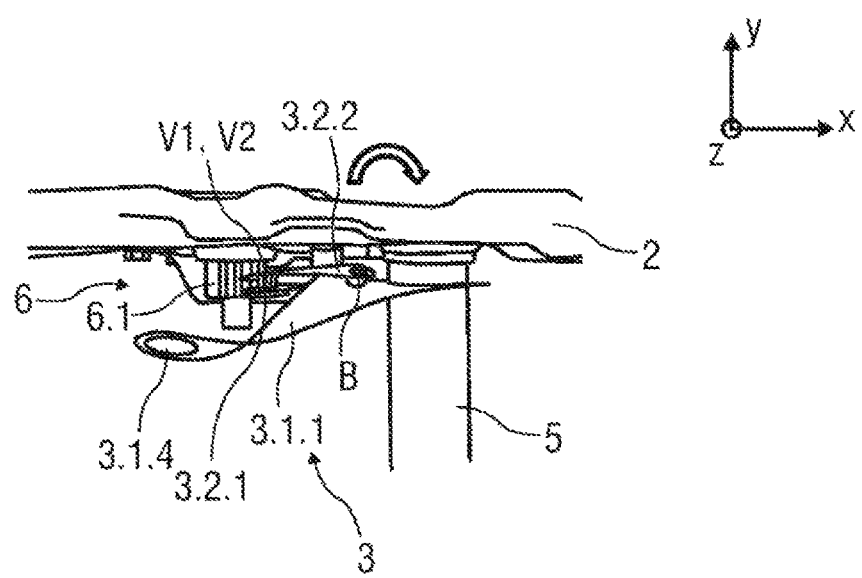
FIG. 12 is a schematic view of the detail of the vehicle seat according to FIG. 9 in a view from below.

FIGS. 11 and 12 show an example of deformation of the connecting element 3 with the action of external forces.

FIGS. 11 and 12 show in this case the detail of the vehicle seat 1 according to FIGS. 9 and 10 after the action of external forces, such as for example a collision, wherein the connecting element 3 has been deformed.

The connecting element 3 in this case is deformed such that an angle between the second leg 3.1.2 and the first leg 3.1.1 in the first plane is reduced as FIG. 11 shows.

Due to the enlarged first region X1 relative to the prior art, in contrast to the exemplary embodiment shown in FIGS. 4 and 5, the connecting element 3 is less heavily deformed in the direction of the transverse axis y, as FIG. 12 shows.

This has the result that the toothings V1, V2 and the teeth of the pinion 6.1 are displaced only slightly relative to one another so that the connecting element 3 and the adjusting unit 6 are still mechanically operatively connected to one another. An adjustment of the height of the vehicle seat 1 in this case is also possible.

While specific embodiments of the invention have been shown and described in detail to illustrate the application of the principles of the invention, it will be understood that the invention may be embodied otherwise without departing from such principles.

The invention claimed is:

1. A connecting element for adjusting the height of a vehicle seat, the connecting element comprising:
   an angular element comprising at least one first leg with a receiving opening on a seat part side arranged at one end and a receiving opening on a rail side, arranged at an opposite end, and a second leg, which is angled relative to the first leg, wherein the receiving opening on the seat part side is located in a connection area of the first leg and of the second leg, the angular element further comprising a third leg angled relative to the second leg, the third leg having a free end spaced apart from the first leg; and
   a toothed element comprising two sections, which are angled relative to one another, wherein the two sections comprise:
   a first section that is substantially configured as a circular arc comprising a toothing and is connected at an end side to the second leg; and
   a second section which is angled from the first section in a direction of the receiving opening on the seat part side and is connected at another end side to the first leg.

2. The connecting element as claimed in claim 1, wherein a fastening point of the second section to the first leg is arranged between the receiving opening on the seat part side and the receiving opening on the rail side, such that a spacing of the fastening point relative to the receiving opening on the seat part side is smaller than the receiving opening on the rail side.

3. The connecting element as claimed in claim 1, wherein the toothed element is connected by a force-fit connection to the angular element.

4. The connecting element as claimed in claim 1, wherein the angular element is substantially configured so as to form a first plane and the toothed element is configured so as to form a second plane parallel thereto so that one end of the toothed element at least partially overlaps and is in contact with the first leg or the second leg or both the first leg and the second leg.

5. The connecting element as claimed in claim 1, wherein the third leg is fastened to the second leg and comprises a further toothing, wherein the third leg is arranged so as to bear against the first section such that the toothings extend with tooth contours flush against one another.

6. A vehicle seat comprising:
   a seat part;
   at least one guide rail; and
   at least one connecting element comprising:
   an angular element comprising at least one first leg with a receiving opening on a seat part side arranged at one end and a receiving opening on a rail side, arranged at an opposite end, and a second leg, which is angled relative to the first leg, wherein the receiving opening on the seat part side is located in a connection area of the first leg and of the second leg, the angular element further comprising a third leg angled relative to the second leg, the third leg having a free end spaced apart from the first leg; and
   a toothed element comprising two sections, which are angled relative to one another, wherein the two sections comprise:
   a first section that is substantially configured as a circular arc comprising a toothing and is connected at an end side to the second leg; and
   a second section which is angled from the first section in a direction of the receiving opening on the seat part side and is connected at another end side to the first leg, wherein:
   the at least one connecting element connects the seat part to the guide rail; and
   by means of the connecting element, a vertical position of the seat part relative to the guide rail is able to be altered.

7. The vehicle seat as claimed in claim 6, wherein the receiving opening on the seat part side forms with the seat part a first rotary joint and in that the receiving opening of the first leg on the rail side forms with the guide rail a second rotary joint.

8. The vehicle seat as claimed in claim 7, wherein a pinion is arranged on the seat part, said pinion engaging in the toothing of the connecting element.

9. The vehicle seat as claimed in claim 6, wherein a fastening point of the second section to the first leg is arranged between the receiving opening on the seat part side and the receiving opening on the rail side, such that a spacing of the fastening point relative to the receiving opening on the seat part side is smaller than the receiving opening on the rail side.

10. The vehicle seat as claimed in claim 6, wherein the toothed element is connected by a force-fit connection to the angular element.

11. The vehicle seat as claimed in claim 6, wherein the angular element is substantially configured so as to form a first plane and the toothed element is configured so as to form a second plane parallel thereto so that one end of the toothed element at least partially overlaps and is in contact with the first leg or the second leg or both the first leg and the second leg.

12. The vehicle seat as claimed in claim 6, wherein the third leg is fastened to the second leg and the third leg comprises a further toothing, wherein the third leg is arranged so as to bear against the first section such that the toothings extend with tooth contours flush against one another.

13. A connecting element for adjusting the height of a vehicle seat, the connecting element comprising:
an angular element comprising a first leg, a second leg and a third leg, the first leg comprising a first leg first end portion and a first leg second end portion, the first leg first end portion being located opposite the first leg second end portion, the first leg first end portion comprising a receiving opening on a seat part side, the first leg second end portion comprising a receiving opening on a rail side, the second leg comprising a second leg portion arranged adjacent to the first leg second end portion, the second leg extending at a second leg angle relative to the first leg, the third leg extending at a third leg angle relative to the second leg, the third leg having a third leg end portion, the third leg end portion being located at a spaced location from the first leg and the second leg; and
a toothed element comprising a first section and a second section, the first section comprising an arcuate contour and first section teeth, the first section comprising a first section end portion, the first section end portion contacting the second leg, the second section extending at a second section angle from the first section in a direction of the receiving opening on the seat part side, the second section comprising a second section end portion in contact with the first leg.

14. The connecting element as claimed in claim 13, wherein at least a portion of the second section is free of teeth, the toothed element being arranged on one side of the angular element.

15. The connecting element as claimed in claim 13, wherein the first leg, the second leg and the third leg are integrally connected to each other to form a one piece angular element structure.

16. The connecting element as claimed in claim 13, wherein the first leg comprises a first leg outer peripheral surface, the second leg comprising a second leg outer peripheral surface, the third leg comprising a third leg outer peripheral surface, the third leg outer peripheral surface comprising a third leg first peripheral surface portion, a third leg second peripheral surface portion and a third leg third peripheral surface portion, the third leg first peripheral surface portion defining a plurality of teeth, the third leg second peripheral surface portion defining an outer contour of the third leg end portion, the third leg second peripheral surface portion being located opposite a portion of the first leg outer peripheral surface, the third leg third peripheral surface portion being located opposite another portion of the first leg outer peripheral surface and the second leg outer peripheral surface.

17. The connecting element as claimed in claim 13, wherein the first leg comprises a first leg outer peripheral edge, the first leg outer peripheral edge being located at a spaced location from the third leg end portion.

18. The connecting element as claimed in claim 13, wherein a space is defined by at least the third leg end portion and at least a portion of the first leg.

19. The connecting element as claimed in claim 13, wherein the toothed element extends from the second leg to the first leg, wherein the toothed element bridges a space between the first leg and the second leg.

20. The connecting element as claimed in claim 13, wherein a portion of the toothed element is located adjacent to the third leg.

* * * * *

UNITED STATES PATENT AND TRADEMARK OFFICE
CERTIFICATE OF CORRECTION

PATENT NO. : 10,239,422 B2
APPLICATION NO. : 15/526823
DATED : March 26, 2019
INVENTOR(S) : Schulz Page 1 of 1

It is certified that error appears in the above-identified patent and that said Letters Patent is hereby corrected as shown below:

On the Title Page

(30) Foreign Application Priority Data should read:
Nov. 13, 2014   (DE) .............................. 10 2014 223 209
Jan. 30, 2015   (DE) .............................. 10 2015 201 649

Signed and Sealed this
Twenty-first Day of May, 2019

Andrei Iancu
*Director of the United States Patent and Trademark Office*